Aug. 22, 1944. J. LIPSKY 2,356,523
CANAL LOCK FOR DRY-DOCKS AND OTHER BASINS
Filed Aug. 29, 1941 7 Sheets-Sheet 1
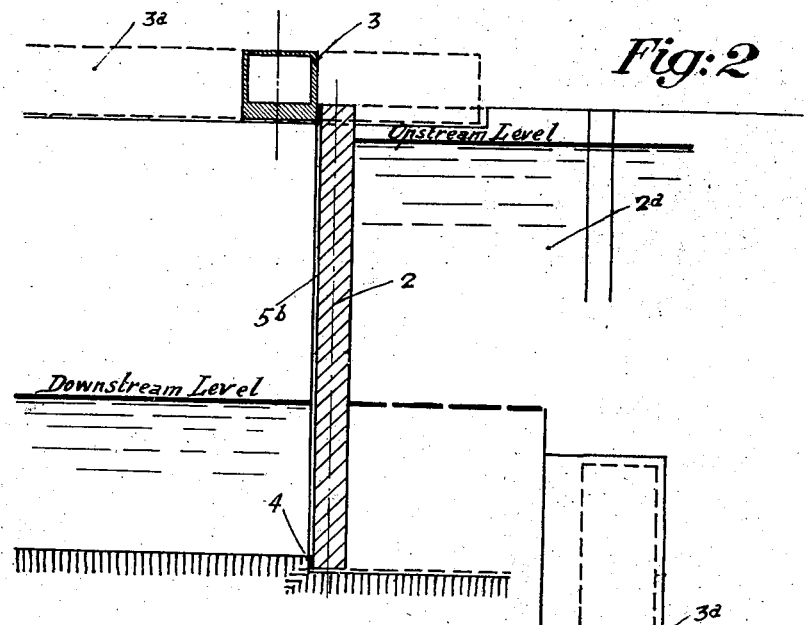
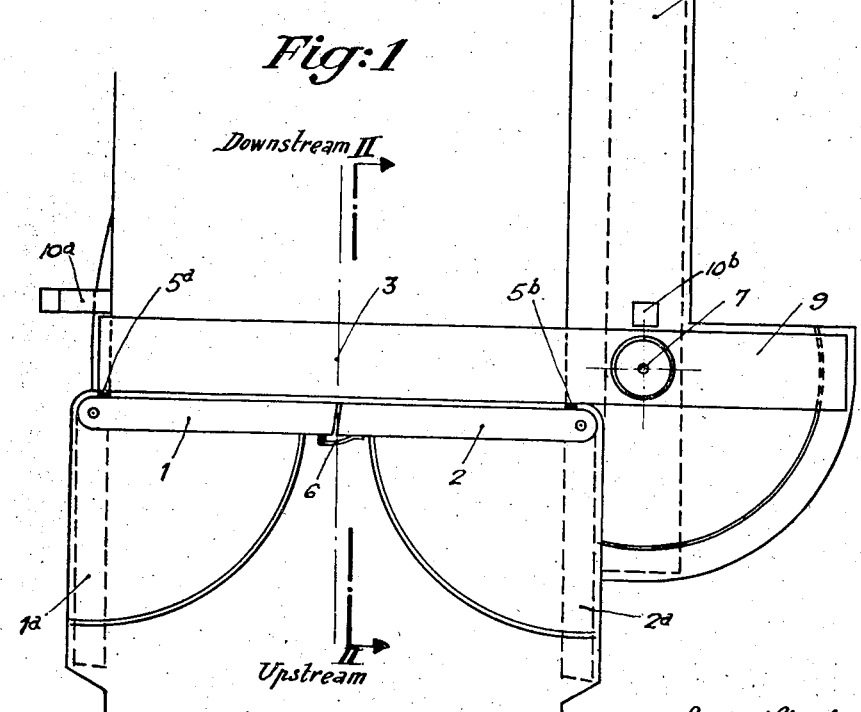

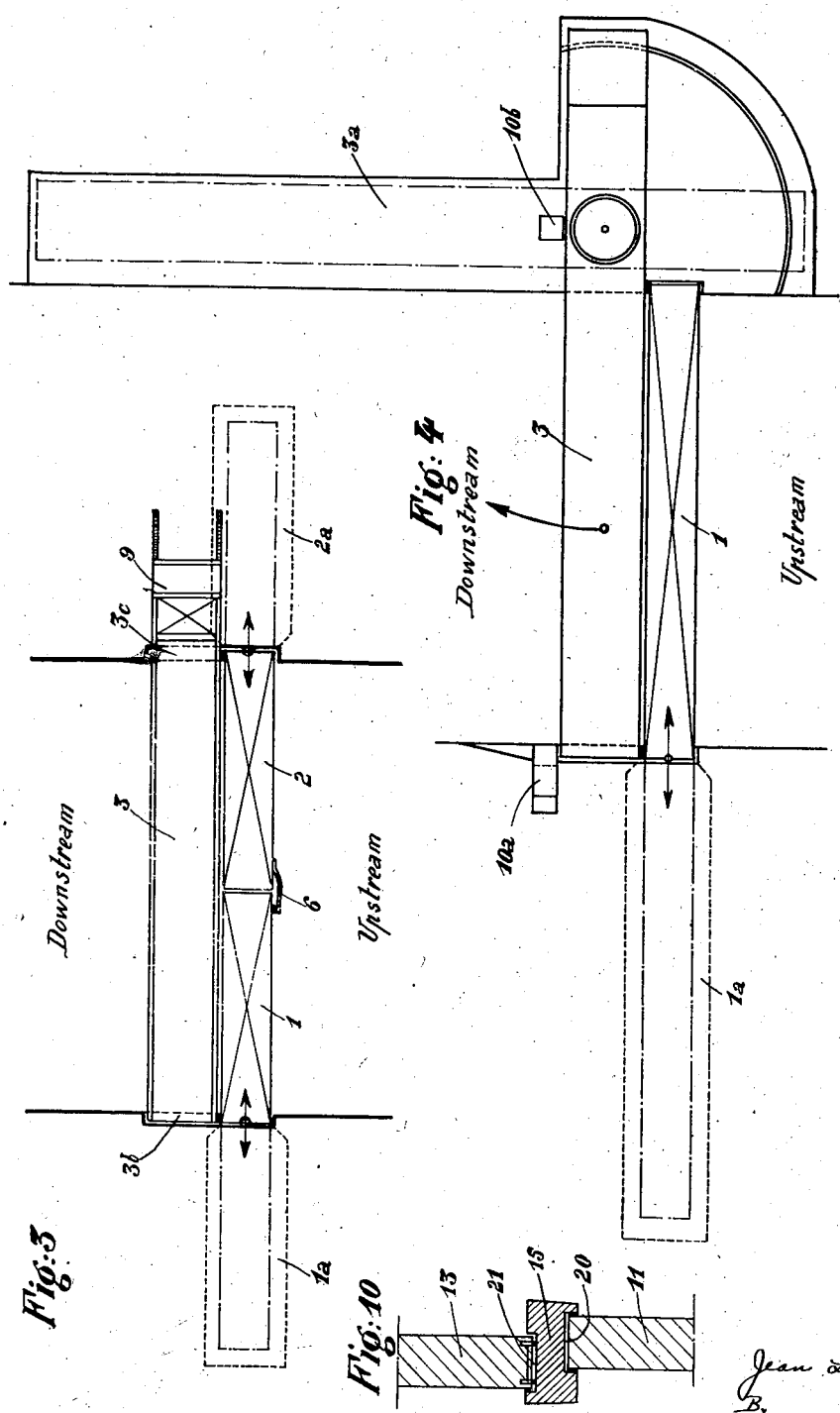

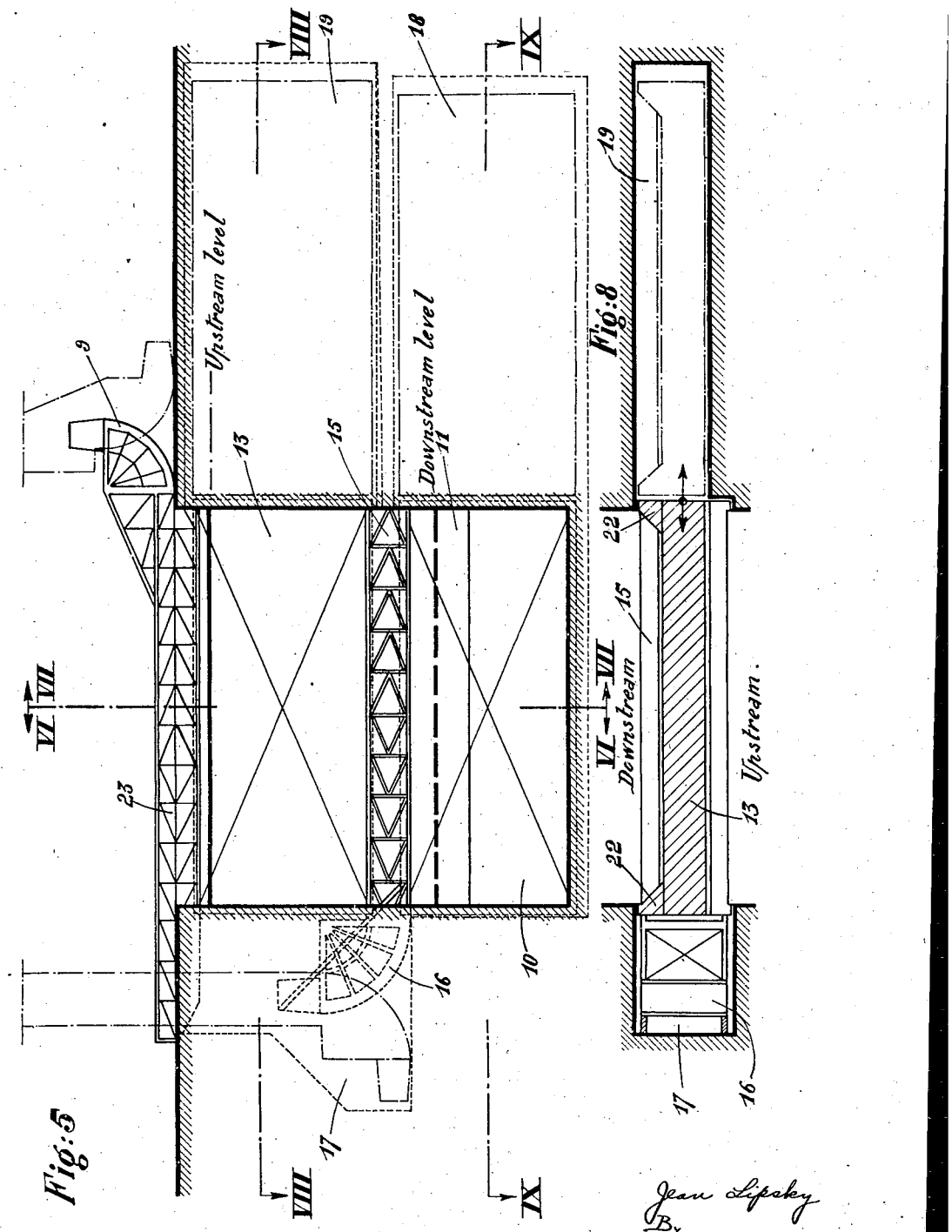

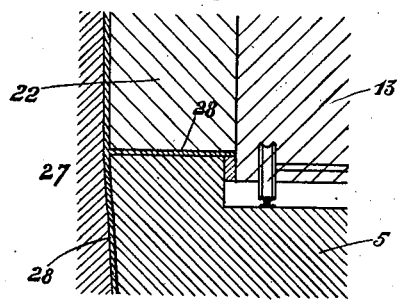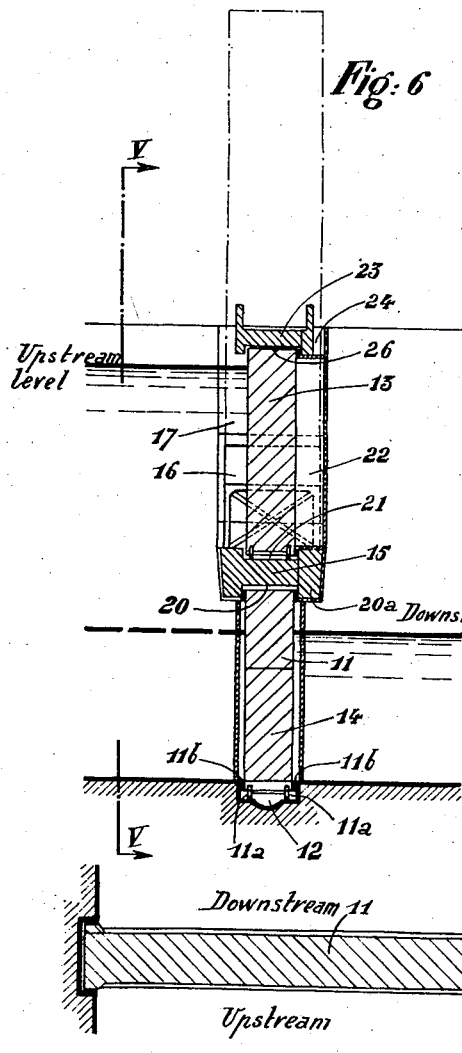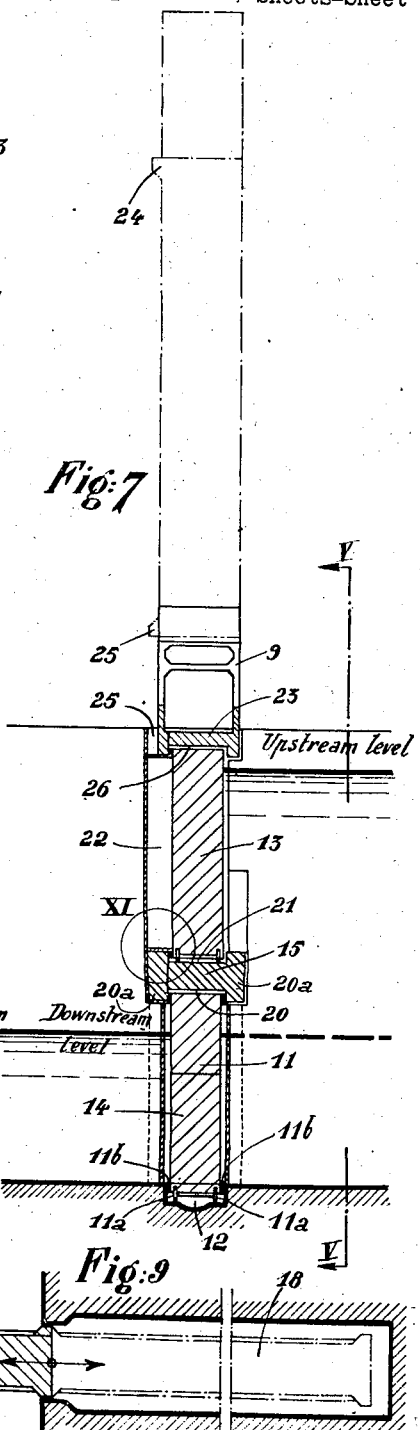

Aug. 22, 1944. J. LIPSKY 2,356,523
CANAL LOCK FOR DRY-DOCKS AND OTHER BASINS
Filed Aug. 29, 1941 7 Sheets-Sheet 5
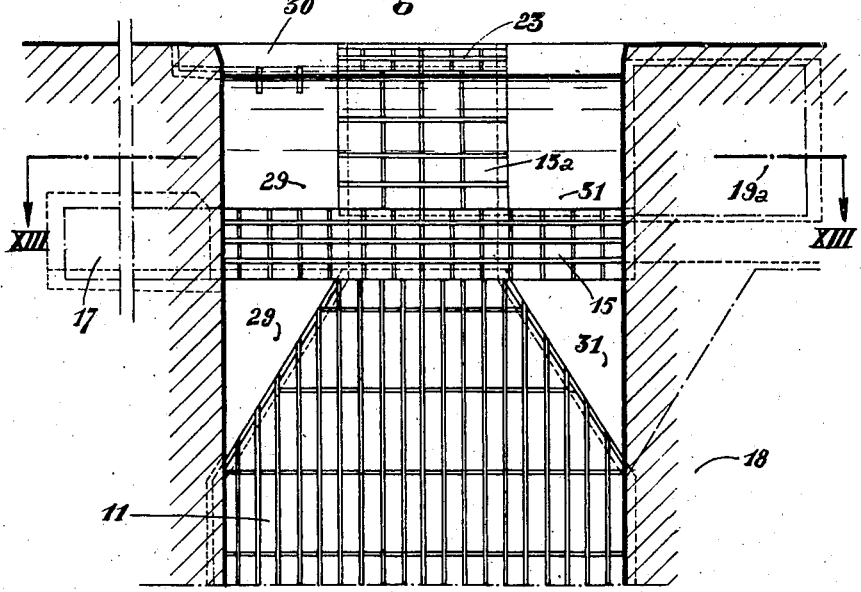
Fig: 12
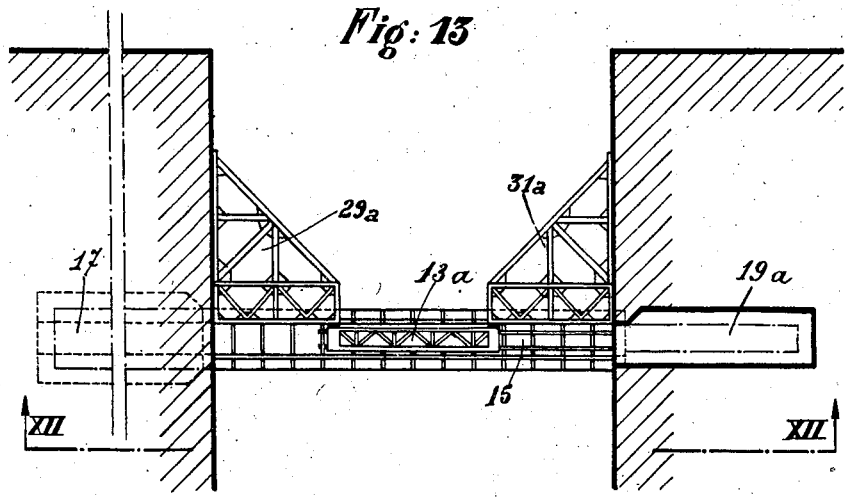
Fig: 13
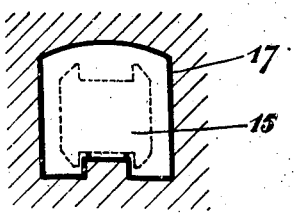
Fig: 16

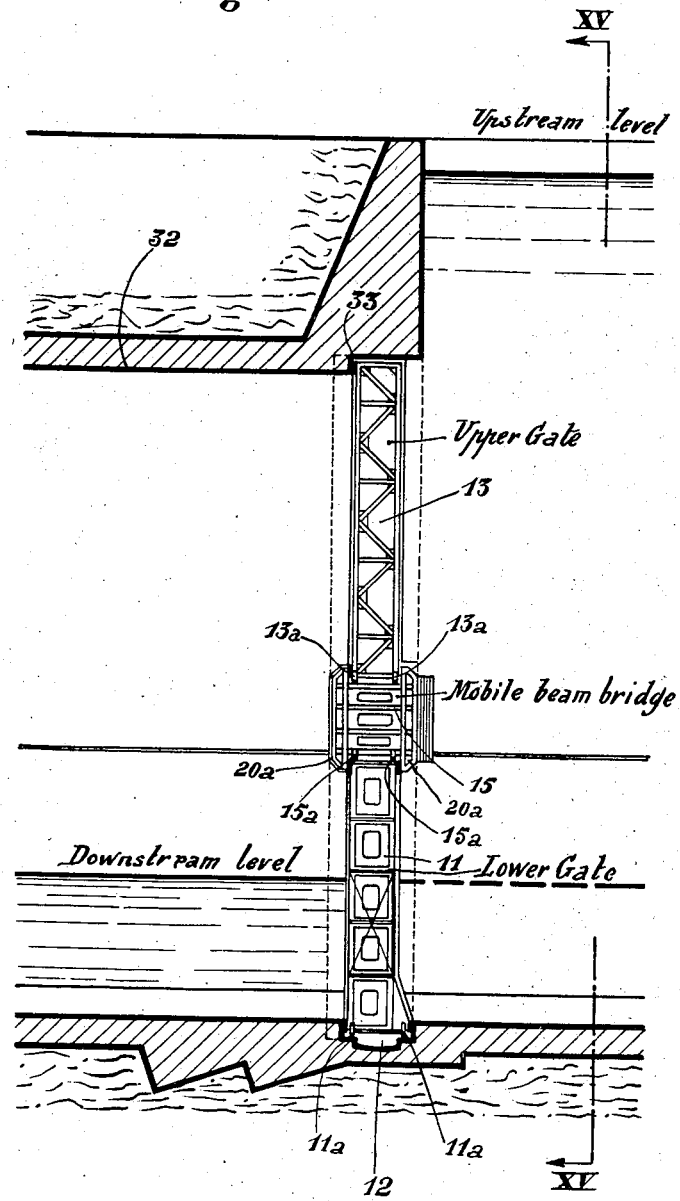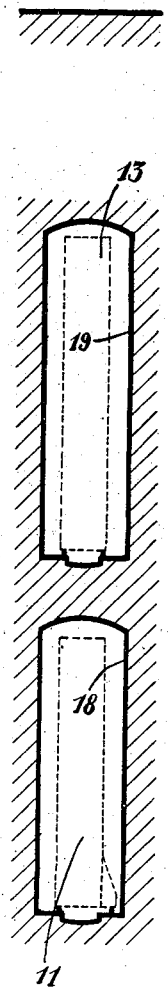

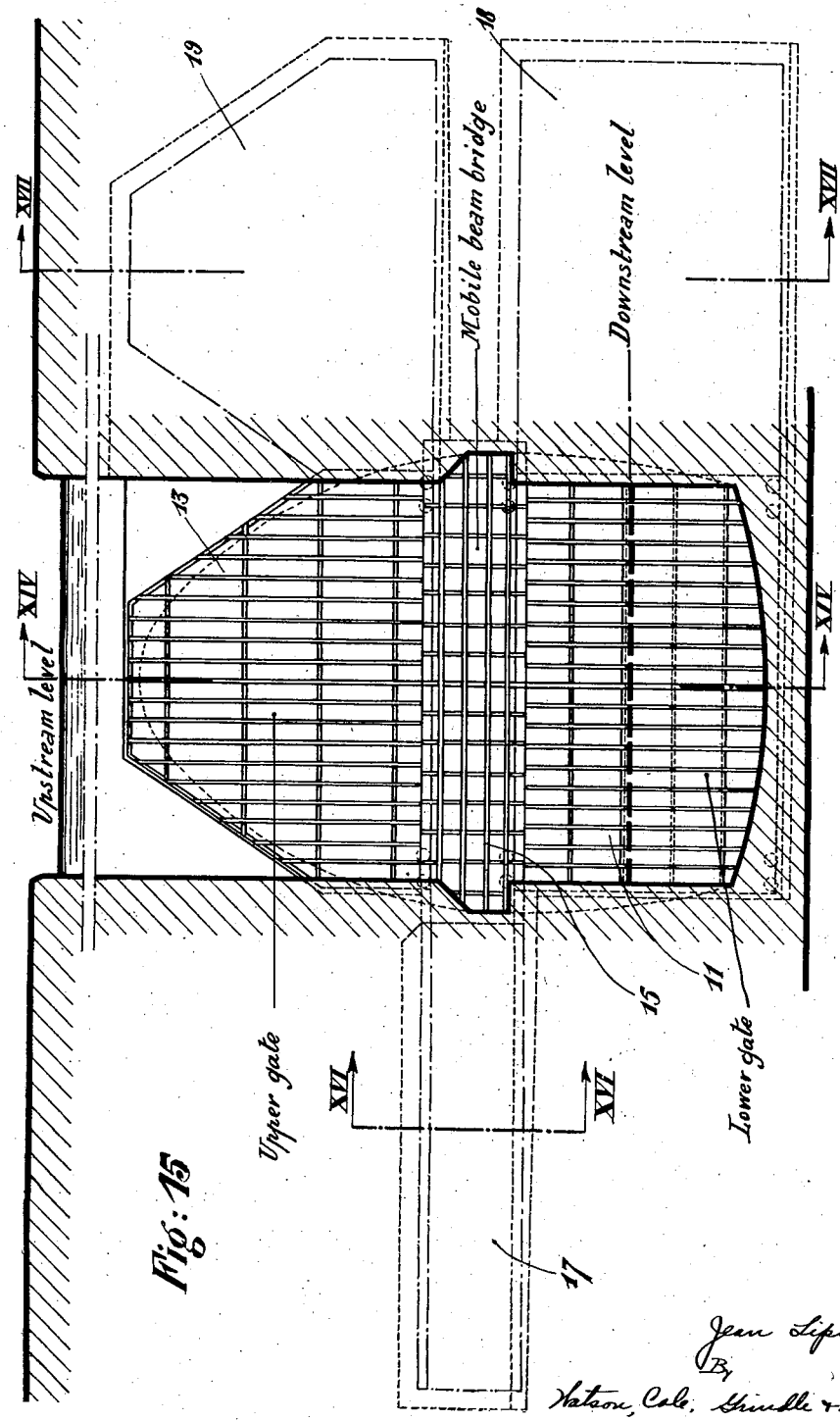

Patented Aug. 22, 1944

2,356,523

UNITED STATES PATENT OFFICE 2,356,523

CANAL LOCK FOR DRY DOCKS AND OTHER BASINS

Jean Lipsky, Uzerche, France; vested in the Alien Property Custodian

Application August 29, 1941, Serial No. 408,902
In France June 14, 1941

12 Claims. (Cl. 61—24)

The construction of a canal lock necessitates conditions of resistance very much greater to normal ones, due to the fact that the top sides of the flood-gates have no bearing to resist the lateral pressure of the water.

The frame or truss-work of the flood-gate acting as a reenforcement at the top can, in no case, be equivalent, as a support, to that obtained on the other three sides by means of the cheeks of the lock bed and the two side walls of the lock. A top frame, having to comply with such conditions of resistance, even if made of special hard steels—assuming that this were possible—would always be so heavy that it would jeopardize the indispensable stability of a construction the mobility and the easy handling of which are essential characteristics of its operation.

Such an arrangement is even more difficult to realize when a sliding flood-gate is considered, the width of which is so much the greater that it can be made of only a single leaf. Sliding flood-gates are nevertheless preferable, if not necessary, for any maritime lock or dry-dock where the water pressures are exerted alternatively in one direction or the other, because, if arched gates were utilized, it would be necessary to dispose two sets of gates set in opposite directions, which condition, aside from the double cost involved, would also entail a rather considerable lengthening of the lock lift and a corresponding increase in the cost.

The difficulties encountered in the construction of a sliding flood gate as heavy as it is voluminous, the importance of the means utilized to operate it, and also the slowness in opening and in closing it as a result of both the weight of the mass to be moved and the distance to be covered throughout the entire opening or closing operation, are the main reasons why arched gates are generally used which gates offer the advantage of halving the mass to be moved, the operating means, and the distance to be covered. But arched gates are generally more expensive and have the disadvantage of lengthening the lock lift within certain limits.

Apart from the water supply problem, the achievement of locks for high water-falls and of large widths has always been impeded by difficulties of construction and operation inherent to the large sizes and weights of the down-stream gates, as well as by important conditions of different kinds which they must satisfy.

These constructions are all the more delicate as they are not rigidly fixed, and as the lateral pressures to which they are subjected do not enjoy a counteracting bearing surface rationally distributed, it being impossible to reenforce the top side of the said construction by means of fixed devices which would impede, after the opening of the gates, the passage of the ships.

On the other hand, once this construction has been achieved, its setting into motion always necessitates an important consumption of power as well as very expensive machinery, and the speed at which it moves is moreover very limited, which condition thus increases the operating time.

The problems which are thus set by the construction and displacement of large gates becomes more and more serious as the height of the water fall increases, and so it becomes necessary to have recourse to a series of double, triple or even quadruple locks to cope with important differences of water-level. Such a solution results in a considerable cost increase to which must automatically be added a lengthening of the time necessary for ships to pass through several locks instead of through a single one.

The main object of my invention is to reduce the weight of the gate itself and to allow its sectionizing lengthwise and along its width, thereby obtaining a saving in the weight of the gates, an easier handling, a greater operating speed, various other kinds of economies, and in certain cases, the saving of additional gates, and the possibility of replacing a series of locks by a single lock.

My invention consists in topping ordinary lock flood-gates, turning, sliding or other gates, with a mobile beam against which the top of the gate will be able to bear, just as the bottom of the gate rests against the lock-sill. This beam, constituting a bridge—which will hereafter be called "mobile beam bridge"—may be made to slide, to tip, to revolve or to rise.

This flood-gate, mobile beam-bridge combination will obtain, among others, the following advantages:

1. Saving in the weight and consequently on the construction costs of the gate properly speaking as well as of the equipment, as a result of the support given to the top side.

2. The reduction in the size and in the weight of the gates.

3. The possibility of dividing into two leaves the sliding door which was constructed up to now in a single leaf.

4. The light weight of the door and its relatively small volume which necessitates, for its operation, a smaller actuating power.

5. The reduction in the time necessary for maneuvering the doors resulting from the speed of the operation consequent to the reduction in the weights and volumes to be set in motion.

6. The possibility of replacing two-leaf revolving gates—exclusively constructed up to now as arched gates—by gates completely flat when closed, bearing at their base against a straight sill, and at their upper part against the mobile beam-bridge.

7. The omission of the arched supplementary downstream doors facing opposite directions, which are constructed to allow the emptying of the lock lift or chamber.

8. The two superposed panel gates with an intermediate mobile beam-bridge which permits the construction of a single water fall lock in lieu of several low water fall locks.

On the whole, it is possible to assert that a single lock replacing a series of three locks may effect a general saving of nearly one half of the total cost of the construction and of the equipment.

The following description and the appended drawings refer to various practical embodiments of my invention given by way of example not inclusive of all cases, it being well understood that the characteristics which appear as well in the drawings as in the text, constitute a part of my invention.

Figure 1 is a plan view of a beam-bridge revolving together with a revolving two-leaf gate, for a single panel lock gate.

Figure 2 is a sectional view II—II of the gate of Fig. 1 along the axis of the lock lift, showing the position of the beam bridge.

Figure 3 is a plan view of a two-leaf sliding gate, resting on a tipping beam-bridge, for a single panel lock gate.

Figure 4 is a plan view of a revolving beam-bridge in conjunction with a single leaf sliding gate for a single panel lock.

Figure 5 is a front sectional view along line V—V of Fig. 7 of a double superposed panel gate comprising two tipping beam bridges operating in conjunction with two gates each of which is composed of a single leaf.

Figure 6 is a transverse sectional view of the gate along the axis of the lock lift (line VI—VI of Fig. 5) and shows, in elevation, the side wall of the lock and the hollow quoin and the tipping mechanism for the lower beam bridge.

Figure 7 is a similar sectional view VII—VII but showing in elevation, the side wall opposite to the preceding one, the hollow quoins for the gates and the tipping mechanism of the upper beam-bridge.

Figure 8 is a horizontal sectional plan view along line VIII—VIII of the upper sliding gate and of its hollow quoin.

Figure 9 is a horizontal sectional plan view along line IX—IX of the lower sliding gate of its hollow quoin.

Figure 10 is a transverse sectional view of the lower beam-bridge showing one embodiment of said beam bridge.

Figure 11 is a detail view of point XI of Fig. 7.

Figure 12 is a front sectional view along line XII—XII in Figure 13 of a multiple panel sliding gate, the panels being superposed, for a high water-fall lock. The two upper panels are modeled to correspond to the profile of the ships only the rigging of which, of little width, needs free space at this height. The beam bridges are of the sliding type.

Figure 13 is a horizontal sectional plan view along line XIII—XIII of the uppermost sliding panel of the gate, and of the recess for the gate, showing the beam-bridge which supports the said panel, and the adjacent recess, as well as the fixed lateral shields between the panel and the lateral walls.

Figure 14 is a sectional view along line XIV—XIV of Fig. 15 in the axis of the lock lift, showing, in elevation, a side wall of the lock and the recesses for the gate panels.

Figure 15 is a front sectional view along line XV—XV of a high water fall, lock-well gate the opening of which in a downstream direction is effected by means of a tunnel. The gate is divided into two sliding panels by an intermediate beam-bridge, also of a sliding type.

Figure 16 is a vertical sectional view of the recess for the beam bridge along line XVI—XVI.

Figure 17 is a similar sectional view along line XVII—XVII of the hollow quoins for the two sliding panels of the gate.

In the embodiment shown in Figs. 1 and 2, the two leaves 1 and 2 mounted free to pivot on hinge-hooks, revolve, when the gate is closed, up against a beam bridge 3, located immediately behind them, down-stream. The main supports for the two panels are the customary lock-sill 4 at the bottom and, at the top, the beam-bridge 3. A tight fit is ensured, down-stream, by elastic joints or by any other means applied against the lock sill 4 on the one hand, and against the two side walls 5a and 5b on the other hand. A joint cover 6 can, combined with other means, stop up the chink between the two leaves.

The beam bridge may be withdrawn by tipping on a ratchet wheel, or as shown, by revolving about a vertical axis 7 sufficiently set back so as not to encroach on the recess 2a for the leaf situated on the same side, 1a being the corresponding recess on the opposite side. A counterweighted arm 9 balances the weight of the beam-bridge.

When the gate is closed, two locks 10a and 10b, given by way of example, transmit the stresses of the beam bridge to the masonry of the side walls.

The operating of the three members which make up the gate, the leaves and the beam bridge can occur, for the rapidity of the operation, simultaneously, or successively if necessary.

In the embodiment shown on Fig. 3, the lock gate comprises two sliding leaves 1 and 2, the top part of which bear, when the gate is closed, against a tipping beam-bridge 3. To open the door, the two leaves are made to retire into the corresponding recesses 1a and 2b. The beam-bridge and its counterweight 9 tip by rolling on the platform of the side wall, freeing themselves from the notches 3b and 3c into which fit the extremities of the beam when the gates are closed and the purpose of which is to transmit to the masonry of the side walls, either directly, or by means of locks as shown on Fig. 1, the stresses due to the pressure of the water on the leaves. Water tight conditions are ensured, not excluding other means, by a device similar to that of Fig. 1 and particularly by a joint cover 6 fastened onto one leaf and bearing on the other leaf, as a result of the pressure of the water.

Figure 4 shows a single leaf sliding gate bearing on a revolving beam-bridge 3 and the recess 1a for the gate. The open position of the beam bridge is shown at 3a. Locks 10a and 10b are given by way of example and serve as lateral supports for the beam bridge when the latter is in a closed position.

Figures 5 to 11 show an example of a sliding gate, comprising two superposed panels, for a high waterfall lock. Numbers 11 and 13 designate the panels the respective heights of which are determined in consideration of the facility with which they can be constructed, the ease with which they can be handled, and the stresses which they will have to exert on the intermediate beam bridge.

The lower panel 11 is made to slide by means of rollers 11a upon which it is mounted, the said rollers running in a groove or guide 12 of the lock bed. The said panel is supported on each side by a sill 11b set against the wall of the groove. A floater chamber 14 of an appropriate size occupies the lower portion of panel 11.

A tipping beam-bridge 15 has its tipping mechanism and its counterweight 16 placed in a recess 17 cut out in the lateral wall opposite to the recesses 18 and 19 for the panels. Its plane of rotation coincides with the axial plane of the gate, so that the groove 20 formed by the flanges 20a of the lower part of this beam-bridge, symmetrically covers the top of the lower panel 11. The latter thus finds a support on each side against water pressures acting in one direction or in the other.

Groove 21 formed by the flanges of the upper part of the beam-bridge constitutes a track way in which the upper panel 13 slides by means of rollers. The downstream flange of the U formed by this upper groove 21 serves as a lateral support for the base of the upper panel 13.

The side faces of the beam bridge, at least in those parts where they bear against the masonry, may be slightly inclined so that they may smoothly fit into their bearings.

In order to laterally transmit the stresses in the door to the side walls and to ensure a good joint, the upper panel 13 is provided with crutch shaped members 22 having the width of the flange of the lower beam bridge 15 and thus concealing the space between the panel and the downstream wall of the recess 17 for the beam bridge, the width of which is much greater than that of the gate. Another crutch shaped organ fulfills a similar function for the recess 19, at the other extremity of the door, the panel having to enter deeply onto the said recess in order to allow the intermediate beam bridge to be lodged in it for closing purposes.

This latter panel 13 is topped by an upper beam-bridge 23 the tipping mechanism of which is situated on the side opposite to that of the lower beam-bridge 15. This beam-bridge is made to tip on the platform of the side wall, above the masonry, against which, it finds lateral support, when in a closed position, by means of the two abutments 24 and 25. The flanges at the lower part of the beam bridge form a groove 26, acting as a guide, by means of which groove the stresses resulting from the pressure of the water on the panel 13 are transmitted to the beam-bridge.

Instead of having the panel topped by the beam-bridge as represented in the embodiment shown, the upper beam-bridge 23 may be located downstream with respect to the gate and may bear on the side wall away from recess 17 for the lower beam bridge and recess 19 for the upper panel, by providing it with a lateral projection to make it adhere to the surface of the top of panel 13.

Water-proof conditions can be obtained, by elastic joints or by any other means, generally on the downstream side, and Figure 11 which shows point XI of Figure 7 in detail is an illustration, by way of example not inclusive of all means, of how continuous water-tight conditions may be ensured by means of packing 28 along the contact lines of the beam bridge 15, the panel 13, the crutch-shaped organ 22 and the side wall 27.

Figure 10 shows, by way of example, one embodiment of the intermediate beam bridge 15 the object of which is to avoid the torsion stresses to which it is subjected due to the fact that the water pressure on the lower panel is much higher than that of the upper panel. The lower panel 11 is offset in an upstream direction with respect to the vertical axis, whereas the upper panel 13 is offset in a downstream direction.

In the gate composed of two superposed panels, the lower panel may also be divided into two sliding leaves, and also two revolving leaves, but in this latter case, the closing of the gates and the closing of the beam-bridge can only take place successively.

In the embodiment described, the operations for closing the lock lift may take place in the following order:

1. Simultaneous setting in place of panel 11, or of the two leaves, and of beam-bridges 15 and 23.

2. Setting in place of panel 13 guided by the two beam-bridges. The order of the operations is reversed for opening the lock-lift.

Figures 12 and 13 relate to a multiple panel gate for a high water-fall lock.

The lower panel 11 retires into the recess 18 by sliding on the lock bed while the intermediary sliding beam-bridge 15 which caps this lower panel when shut, can retire into the recess 17 by sliding on the said panel. The upper panel 13a rolls on this intermediary beam-bridge 15 and can withdraw, to allow the opening of the gate, into a recess 19a. This upper panel 13a is capped by the upper beam-bridge 23 which slides, when the gate is to be opened, behind a shield 29, into a position of rest shown at 30. Symmetrically to shield 29, with respect to the axis of the gate, a second shield 31 is to be found, and the profiles of these two shields 29, 31 are designed in accordance with the profile of ships, so that the space, at the top, which exists between these two shields is smaller than that at the bottom, thus corresponding to the little width of the masts and other projecting apparatus on the decks of ships. This allows to construct the upper leaf 13a of the gate narrower than the lower leaf. The shields 29, 31 which, on the drawing, are supported by metallic trusses 29a, 31a, fixed onto the side walls, can be constructed in reenforced concrete or in any other material capable of resisting the pressure of the water.

Figures 14, 15, 16, and 17 represent an embodiment similar to the preceding one but applied to a well-lock or tunnel-lock. The lock, which is situated at the entrance of the tunnel 32 comprises two sliding panels 11 and 13, separated one from the other by the intermediary beam-bridge 15. To open the lock, panel 13 is made to retire, by sliding on the beam-bridge, into a recess 19; then the beam-bridge 15 retires into the recess 17 by rolling on the lower panel 11, and finally, the lower panel 11 withdraws into the recess 18 by rolling on the lock bed.

The lower panel 11 is provided with rollers 11a rolling in a groove 12 of the lock bed. The beam-bridge 15 is provided with rollers 15a rolling on the lower panel 11 and it comprises flanges 20a which embrace the upper portion of this panel. Finally the upper panel 13 is provided with rollers 13a rolling in the upper groove of the beam-bridge. The top part of this panel 13 is supported, to resist the pressure of the water, by a flange 33 which is an integral part of the tunnel masonry.

What I claim is:

1. In a construction adapted to contain water at variable levels, such as a canal lock or the like, a channel having bottom and side walls, a gate adapted to be moved to and from an operative position across said channel barring flow of water therefrom, a beam adapted to be moved to and from a position crosswise of said channel at a transversely extending edge of said gate, means for securing said beam against displacement in the direction of flow of water in said channel, said beam being in bracing contact with said gate along said edge when the members are in operative position, and means permitting simultaneous withdrawal of said beam and said gate from across said channel.

2. In a construction adapted to contain water at variable levels, such as a canal lock or the like, a channel having bottom and side walls, a gate adapted to be moved to and from an operative position across said channel barring flow of water therefrom, a beam adapted to be moved independently of said gate to and from a position crosswise of said channel at a transversely extending edge of said gate, means on each side of said channel for securing said beam against displacement in the direction of flow of water in said channel, said beam being in bracing contact with said gate along said edge when the members are in operative position, and means permitting simultaneous withdrawal of said beam and said gate from across said channel.

3. In a construction adapted to contain water at variable levels, such as a canal lock or the like, a channel having bottom and side walls, a gate adapted to be moved to and from an operative position across said channel barring flow of water therefrom, means at the walls of the channel for bracing the bottom and side edges of the gate against pressure of water, a beam adapted to be moved independently of said gate to and from a position crosswise of said channel at the upper edge of said gate, means on each side of said channel for securing said beam against displacement in the direction of flow of water in said channel, said beam being in bracing contact with said gate along said upper edge when the members are in operative position, and means permitting simultaneous withdrawal of said beam and said gate from across said channel.

4. In a construction adapted to contain water at variable levels, such as a canal lock or the like, a channel having bottom and side walls, a gate adapted to be moved to and from an operative position across said channel barring flow of water therefrom, means at the walls of the channel for bracing the bottom and side edges of the gate against pressure of water, a beam adapted to be moved independently of said gate to and from a position crosswise of said channel at the upper edge of said gate, means on each side of said channel for securing said beam against displacement in the direction of flow of water in said channel, said beam being provided with flanges embracing said upper edge of the gate to brace said edge against the water pressure when the gate is closed, and means permitting simultaneous withdrawal of said beam and said gate from across said channel.

5. In a construction adapted to contain water at variable levels, such as a canal lock or the like, a channel having bottom and side walls, a gate adapted to be moved to and from an operative position across said channel barring flow of water therefrom, means at the walls of the channel for bracing the bottom and side edges of the gate against pressure of water, a beam adapted to be moved independently of said gate to and from a position crosswise of said channel at the upper edge of said gate, and means on each side of said channel for securing said beam against displacement in the direction of flow of water in said channel, said beam being in bracing contact with said gate along said upper edge when the members are in operative position, and means for permitting said beam to swing from an idle position substantially parallel with the channel to its operative position transversely thereof simultaneously with the movement of said gate to a position crosswise of said channel.

6. In a construction adapted to contain water at variable levels, such as a canal lock or the like, a channel having bottom and side walls, a gate adapted to be moved to and from an operative position across said channel barring flow of water therefrom, means at the walls of the channel for bracing the bottom and side edges of the gate against pressure of water, a beam adapted to be moved independently of said gate to and from a position crosswise of said channel at the upper edge of said gate, and means on each side of said channel for securing said beam against displacement in the direction of flow of water in said channel, said beam being in bracing contact with said gate along said upper edge when the members are in operative position, and means for permitting said beam to shift horizontally from an idle position substantially parallel to the channel to an operative position transversely of the channel, simultaneously with the movement of said gate to a position crosswise of the channel.

7. In a construction adapted to contain water at variable levels, such as a canal lock or the like, a channel having bottom and side walls, a gate adapted to be moved to and from an operative position across said channel barring flow of water therefrom, means at the walls of the channel for bracing the bottom and side edges of the gate against pressure of water, a beam adapted to be moved independently of said gate to and from a position crosswise of said channel at the upper edge of said gate, and means on each side of said channel for securing said beam against displacement in the direction of flow of water in said channel, said beam being in bracing contact with said gate along said upper edge when the members are in operative position, and means for swinging said beam from an idle substantially vertical position at the side of the channel to an operative position transversely of the channel, simultaneously with the movement of said gate to a position crosswise of the channel.

8. In a construction adapted to contain water at variable levels, such as a canal lock or the like, a channel having bottom and side walls, a gate adapted to be moved to and from an operative position across said channel barring flow of water therefrom, means at the walls of the channel for bracing the bottom and side edges of the gate against pressure of water, said gate comprising two or more superposed sections, a beam adapted to be moved independently of said gate to and from a position transversely of said channel between adjacent edges of said sections and in bracing contact therewith against water pressure, means on each side of said channel for securing said beam against movement in the direction of water pressure, and means permitting simultaneous withdrawal of said beam and one section of said gate from across said channel.

9. In a construction adapted to contain water at variable levels, such as a canal lock or the like, a channel having bottom and side walls, a gate adapted to be moved to and from an operative position across said channel barring flow of water therefrom, means at the walls of the channel for bracing the bottom and side edges of the gate against pressure of water, said gate comprising two or more superposed sections, a beam adapted to be moved independently of said gate to and from a position transversely of said channel between adjacent edges of said sections and in bracing contact therewith against water pressure, means on each side of said channel for securing said beam against movement in the direction of water pressure, another beam adapted to be similarly secured, extending across the channel and in bracing relationship to the upper edge of the uppermost gate section whereby each gate section will have a superposed beam, and means permitting simultaneous withdrawal of at least one of said gate sections and the associated superposed beam from across said channel.

10. The arrangement set forth in claim 8 in which the beam is provided with lower flanges embracing the upper edge of the lower gate section, and upper flanges embracing the lower edge of the upper gate section.

11. The arrangement set forth in claim 9 in which the gate sections are constructed and arranged to be successively slid into position transversely of the channel beginning with the lowermost section, and the beams are constructed and arranged to be swung from substantially vertical positions on opposite sides of the channel beginning with the lowermost beam, whereby the upper gate section may be guided by the upper flanges of the lower beam when said gate is slid into position.

12. The arrangement set forth in claim 9 in which the upper gate sections are narrower than the lower ones to correspond to the profile of the hull and rigging of ships which pass through the channel, and permanent baffles are provided on the upper portions of the side walls of the channel to support the narrow upper gate section in operative position.

JEAN LIPSKY.